No. 732,350. Patented June 30, 1903.

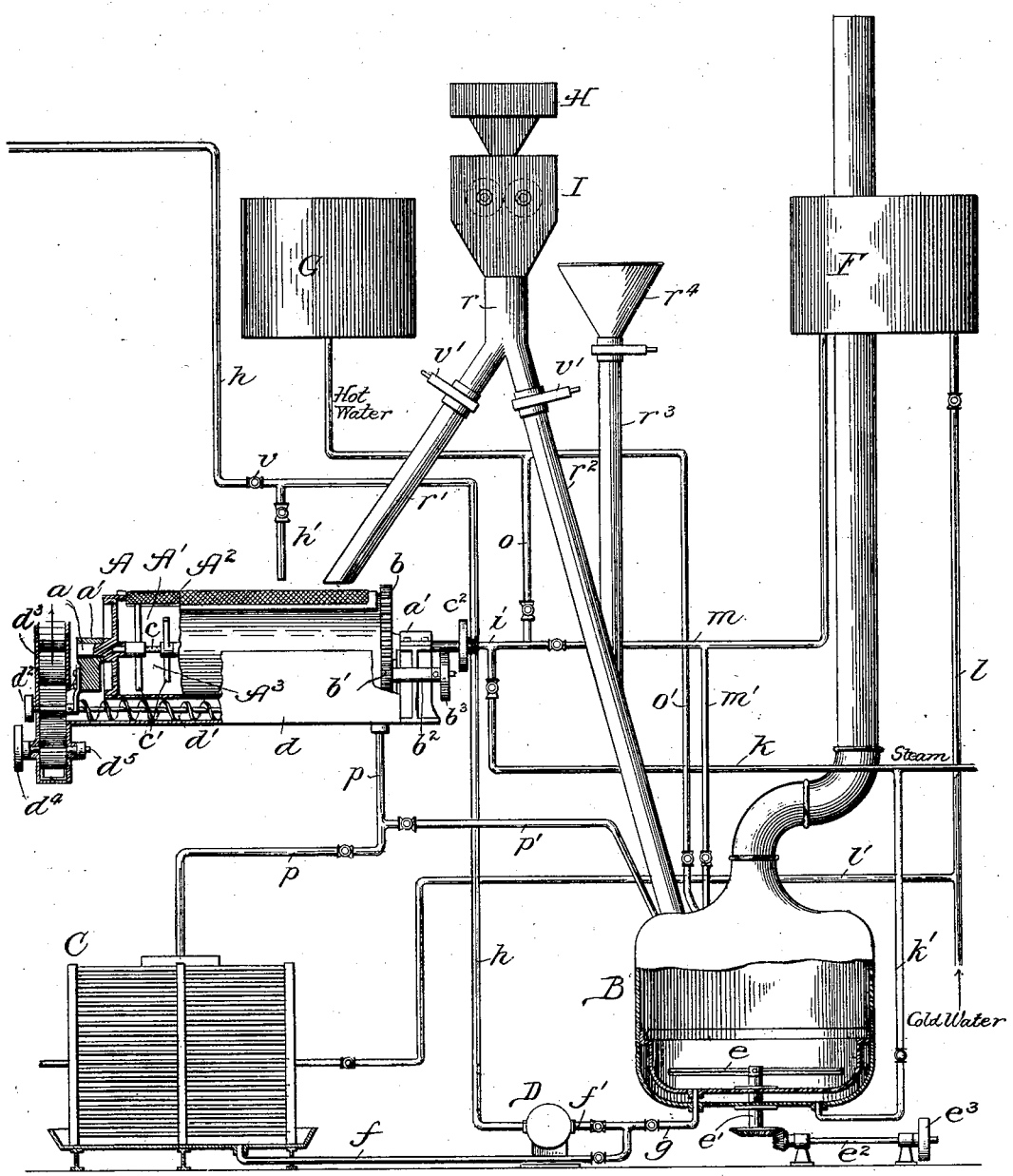

UNITED STATES PATENT OFFICE.

MAX HENIUS, OF CHICAGO, ILLINOIS.

BREW-HOUSE-APPARATUS EQUIPMENT.

SPECIFICATION forming part of Letters Patent No. 732,350, dated June 30, 1903.

Application filed October 9, 1902. Serial No. 126,435. (No model.)

*To all whom it may concern:*

Be it known that I, MAX HENIUS, a citizen of the United States, residing at Chicago, in the county of Cook and State of Illinois, have invented a new and useful Improvement in Brew-House-Apparatus Equipment, of which the following is a specification.

My invention relates to an improvement in the equipment of apparatus employed in the department of a brewery known as the "brew-house," which is devoted to the operation of producing the wort by practicing the several generally-stated steps of making the mash, drawing off and hopping and boiling the resultant wort, separating the hopped wort from the hops, and finally cooling the hopped wort preparatory to pumping it into the fermentation-vat.

Hitherto the equipment employed in the manufacture of the wort in the brew-house has involved a multiplicity of apparatus, which has rendered not only the installation of the plant in the matter of building and apparatus but also the maintenance and operation very expensive.

The object of my improvement is to simplify the apparatus equipment for a brew-house by reducing to the minimum the number of apparatuses for practicing the several necessary steps in wort manufacture by adapting a number of the compartively few apparatuses provided to perform each several of the steps of the process where hitherto a separate apparatus was in most or at least some instances required for the practice of each separate step.

The accompanying drawing presents a view, diagrammatic in its nature, of my simplified system of brew-house-apparatus equipment, partly in elevation and partly broken.

A is the apparatus I have devised for use for the purposes of a mash-tun and a wort-separator. It comprises as its preferred construction in matters of detail a chamber $A'$, preferably of the cylindrical shape represented, rotatably mounted at its trunnions $a$ in suitable end bearings $a'$ and provided about one end with a cog-gear $b$, engaged by a pinion $b'$ on one end of a rotary shaft $b^2$, carrying at its opposite end a belt-pulley $b^3$. Within the chamber $A'$ is a rotary stirrer $A^3$, comprising a tubular shaft $c$, shown perforated and carrying blades $c'$ at intervals, which may be hollow and perforated instead of perforating the shaft, the latter being rotatably mounted in the opposite heads of the chamber and carrying on one of its journals a belt-pulley $c^2$, by which to drive it. In the wall of the chamber is an opening covered by a strainer $A^2$, which is preferably removable, and beneath the chamber A is supported a receptacle or trough $d$, containing a rotary worm conveyer $d'$, adapted to be actuated at a belt-pulley $d^2$ on one end of its shaft, the trough discharging into a suitable conveyer $d^3$, adapted to be driven by a belt-pulley $d^4$ on a shaft $d^5$.

B is the steam-jacketed vessel I employ as a mash-tun and cooker or kettle and which contains a rotary stirrer $e$ on a vertical shaft $e'$, journaled in the bottom of the device and geared for driving it with a shaft $e^2$, carrying a belt-pulley $e^3$, by which to rotate it.

C is a cooler, that shown being of the well-known Baudelot variety, and D denotes a force-pump involving any well-known or suitable construction, communicating at its suction side at a valve-controlled pipe $f'$ with the cooler through a valve-controlled pipe $f$ and through a similar pipe $g$ with the vessel B, and a pipe $h$, containing a shut-off valve $v$, leads from the discharge side of the pump into a fermenting-vat (not shown) and through a valved branch pipe $h'$ to the chamber $A'$.

A convertible mash-tun and wort-separator such as that contained in the apparatus A, a vessel, such as the vessel B, a pump D, and a cooler C, coöperatively combined together to adapt them for use as hereinafter described, constitute the essential elements of my improvement.

A valved steam-pipe $k$, leading from a steam-supply source, (not shown,) discharges into a pipe $i$, leading into one end of the stirrer-shaft $c$ of the apparatus A and has a valved branch $k'$ for conducting steam into the jacket of the vessel B. An elevated cold-water tank F, supplied from a suitable source through a valved pipe $l$, having a valved branch $l'$, leading to the cooler, is shown to communicate with the pipe $i$ through a valved pipe $m$, having a valved branch $m'$, discharging into the vessel B. An elevated hot-water tank G is shown to communicate with the pipe $m$ through a valved pipe $o$ and to discharge into the vessel B through a valved branch $o'$. The trough $d$ discharges upon the cooler C through a valved pipe $p$, having a valved branch $p'$, discharging into the vessel B.

The provision and arrangement of steam and hot and cold water supplying means are matters of convenience and do not modify or limit my invention, and the same is true of the means shown to be provided for feeding to the apparatus the malt and cereals to be treated. The means last referred to, shown in the drawing to be provided, are an automatic scale (indicated at II) and discharging into a grinding-mill I, the scale and mill each involving any well-known or suitable construction, a feed-pipe $r$, leading from the hoppered discharge of the mill and having a branch $r'$, discharging into the chamber A' and containing a slide-valve $v'$, and a branch $r^2$, containing a slide-valve $v'$ and leading to the vessel B, the branch $r^2$ having connected with it a vertical feed-pipe $r^3$, provided with a hopper-top $r^4$ and also with a slide-valve $v'$.

To manufacture wort according to the process usually practiced in the art of brewing beer with my simplified apparatus equipment, the procedure is as follows: With the required amount of water in proper condition introduced from the supply-tanks into the chamber A', (from which the strainer has been preparatorily removed,) in its position illustrated in the drawing, and into the vessel B, a suitable proportion of malt is fed through the branch pipe $r'$ into said chamber and a suitable proportion of the same is fed into the vessel B through the branch pipe $r^2$, and the desired quantity of cereal may also be fed into the vessel B through the stand-pipe $r^3$. The stirrers $A^3$ and $e$, respectively, in said chamber and vessel are actuated until the mash in each has been brought to the desired condition. Thereupon the contents of the vessel B are discharged through the pipes $g$, $h$, and $h'$ into the chamber A' by actuating the pump D, and the mashing is continued in the chamber until completed, when the stirrers are arrested and the chamber A' after replacing the strainer is turned around to bring the strainer $A^2$ lowermost. Thus with the valve in the pipe $p'$ opened the liquor from the mash filters through the strainer $A^2$ into the trough $d$ and discharges thence through the pipes $p\,p'$ into the vessel B. The mash-tun in the apparatus A is thus converted into a wort-separator, and the product of the usual sparging performed in the chamber A' is also run in the same way into the vessel B. Hops are then added through the stand-pipe $r^3$ to the contents of the vessel B, which are adequately boiled by steam admitted into its jacket from the pipe $k$, thus converting the use of that vessel from a mash-tun into a brew-kettle or cooker. After the boiling the mixture of hops and liquor in the kettle is introduced, by actuating the pump, through the pipes $g$, $h$, and $h'$ into the chamber A', preferably with the strainer still lowermost, when the introduction into the chamber of the contents of the kettle would be through an opening (not shown) in the wall of the chamber opposite the strainer. While boiling the contents of the kettle the chamber A' is thoroughly rinsed out to cleanse it for the reception of said contents, and upon removing the strainer for the purpose the residue is evacuated from the chamber A' into the trough $d$, when the conveyer $d'$ is actuated to work the grains to the elevator $d^3$, which carries them off to a suitable dump. (Not shown.) By introducing the hopped contents of the vessel B into the chamber A', with the strainer replaced, such contents filter the hopped wort through the strainer and it is caught in the trough $d$ (which has also been preparatorily cleansed after conveying out of it the residue of grains from the mashing step) and caused to pass thence through the pipe $p$ over the cooler C, from which it is introduced by the action of the pump D through the pipes $f$ and $h$ into the fermenting-vat.

It is needless to state herein the different apparatuses in a brew-house that my improvement enables to be dispensed with, as they are known without stating them to those skilled in the art, who will also readily realize the practical advantages in the saving of time and expense of my improved equipment.

What I claim as new, and desire to secure by Letters Patent, is—

1. A brew-house-apparatus equipment consisting of a vessel having in its otherwise imperforate wall a strainer-covered opening and mounted to be inverted whereby to permit of its alternate use as a mash-tun and a wort-separator, a second vessel controllably communicating with the first-named vessel, heating means for the second-named vessel, a cooler to which the first-named vessel discharges, and a pump having valve-controlled communication at its suction side with the second-named vessel and cooler and having a discharge-pipe leading to the first-named vessel.

2. A brew-house-apparatus equipment consisting of a vessel having in its otherwise imperforate wall a strainer-covered opening and mounted to be rotated to bring said opening uppermost or lowermost whereby to permit of its alternate use as a mash-tun, a wort-separator and a hop-jack, a second vessel controllably communicating with the first-named vessel, means for supplying materials to said vessels, heating means for said vessels, a cooler to which the first-named vessel discharges, and a pump having valve-controlled communication at its suction side with the second-named vessel and cooler and having a discharge-pipe leading to the first-named vessel.

3. A brew-house-apparatus equipment consisting of a vessel having in its otherwise imperforate wall a strainer-covered opening and mounted to be rotated to bring said opening uppermost or lowermost whereby to permit of its alternate use as a mash-tun, a wort-separator and a hop-jack, a receptacle supported below and adjacent to said vessel, a second vessel controllably communicating with said receptacle, heating means for said vessels, a cooler to which said receptacle discharges, and a pump having valve-controlled communication at its suction side with the second-named vessel and cooler and having a discharge-pipe leading to the first-named vessel.

4. A brew-house-apparatus equipment consisting of a vessel having in its otherwise imperforate wall a strainer-covered opening and mounted to be rotated to bring said opening uppermost or lowermost whereby to permit of its alternate use as a mash-tun, a wort-separator and a hop-jack, a receptacle supported below and adjacent to said vessel, a conveyer in said receptacle, a second vessel controllably communicating with said receptacle, heating means for said vessels, a cooler to which said receptacle discharges, and a pump having valve-controlled communication at its suction side with the second-named vessel and cooler and having a discharge-pipe leading to the first-named vessel.

5. A brew-house-apparatus equipment consisting of a vessel having in its otherwise imperforate wall a strainer-covered opening and mounted to be rotated to bring said opening uppermost or lowermost whereby to permit of its alternate use as a mash-tun, a wort-separator and a hop-jack, a receptacle supported below and adjacent to said vessel, a second vessel controllably communicating with said receptacle, a cooler to which said receptacle discharges, a pump having valve-controlled communication at its suction side with said vessel and cooler and a discharge-pipe leading to the first-named vessel and through which the hopped wort is conveyed off for fermentation, a feed-pipe having valved branches leading respectively to said vessels, a stand-pipe on one of the branches, elevated hot and cold water supply holders, valved water-conducting pipes leading from said holders to said vessels, and valved steam-pipes leading to said vessels.

MAX HENIUS.

In presence of—
　ALBERT D. BACCI,
　J. W. DYRENFORTH.